April 27, 1965 M. MÜLLER 3,181,083

HIGH-FREQUENCY TUNNEL-DIODE OSCILLATOR

Filed Dec. 19, 1961

INVENTOR.
MARTIN MÜLLER
BY Philip M. Bolton
ATTORNEY

United States Patent Office 3,181,083
Patented Apr. 27, 1965

3,181,083

HIGH-FREQUENCY TUNNEL-DIODE OSCILLATOR

Martin Müller, Pforzheim, Germany, assignor to International Standard Electric Corporation, New York, N.Y., a corporation of Delaware Filed Dec. 19, 1961, Ser. No. 160,618
Claims priority, application Germany, Dec. 21, 1960, St 17,255
11 Claims. (Cl. 331—107)

This invention relates to arrangements for amplifying or generating very high-frequency oscillations and more particularly to such an arrangement employing an Esaki or tunnel diode.

Heretofore conventional types of microwave oscillators and amplifiers have been built by using active elements of a two-port (four-pole) character. Such elements are, for example, the grid-controlled electron tube, the transistor, the two-chamber klystron tube and the attenuated travelling-wave tube. In such types of active two-port elements, $k$ is defined as the feedback factor. In the case of amplifiers, $k$ is made as small as possible, and in the case of oscillators, $k$ fixes the resulting oscillation frequency and amplitude, that is, in such a way that in the steady state $k$ exactly equals 1, according to magnitude and phase, (or $-1$, depending on the predetermined sign). In the original state of most of such elements, that is, prior to being used in an oscillation circuit, $|k|<<1$. These elements are easily employed to provide a monochromatic, automatically starting oscillator if, with respect to the desired frequency and in the "small-signal manner" $|k|>1$, and a resonant structure is employed so that, within a narrow frequency range, the phase is permitted to adjust itself to the necessary value.

Active elements of a one-port (two-pole) character, also referred to as negative resistors, have been known for some time. Some of these elements are the Maser, the parametric diode, and the Esaki or tunnel diode. The first two elements mentioned above have the negative-resistance character (for various physical reasons) only within a very limited frequency range, while the Esaki diode is a real negative resistor at all frequencies below its resistive limiting (cut-off) frequency $f_{g,\,R}$. When speaking in terms of the active two-port element, the Esaki diode, in its original state, would have to be characterized by a feedback factor $k>1$, at all frequencies $f<f_{g,\,R}$. This element, therefore, starts to oscillate at any frequency below the frequency limit and produces a very complicated frequency complex which is dependent upon the involved energy storages. The mathematical prediction of the shape of oscillation is extremely difficult and, on the whole, also uninteresting, because it is the intention of the user to obtain either only a monochromatic oscillation or, for the amplifier application, no free oscillation at all. The problem in the case of the Esaki diode, therefore, is exactly opposite to the problem of producing an oscillator from an active two-port element. It is necessary to suppress all oscillation modes with the exception of a single one.

An object of the present invention is to provide an arrangement for amplifying or generating very high frequencies employing an Esaki or tunnel diode.

A feature of the present invention is the provision of a resonant circuit coupled to a diode biased by a biasing means to exhibit a negative-resistance characteristic which, in combination with the internal capacitance and inductance of the diode, provides a strongly undercoupled parallel resonant circuit. A stabilizing resistor is coupled in shunt relation with the biasing means to bypass this means, and an impedance element having a value lower than the resistance value of the stabilizing resistor is coupled to bypass the stabilizing resistor only in the frequency range including the useful oscillations.

Another feature of the present invention is the provision of a coaxial-line resonant cavity as the above-mentioned resonant circuit having the stabilizing resistor built therein at a given location, for instance, in the current loop or current node of the resonant cavity.

Still another feature of the present invention is the provision of a toroidal-disk-shaped stabilizing resistor built into the above-mentioned resonant cavity at a location therein preferably in a current loop of the resonant cavity.

A further feature of the present invention is the provision of a hollow cylindrical-shaped stabilizing resistor built into the above-mentioned resonant cavity at a location therein preferably in a current node of the resonant cavity.

Still a further feature of the present invention is the provision of an open-circuit line section having a length of one-quarter wavelength at the frequency of the useful oscillations as the resistive element bypassing the stabilizing resistor.

The above-mentioned and other features and objects of my invention will become more apparent by reference to the following description taken in conjunction with the accompanying drawings, in which.

Figures 1, 2, 3:
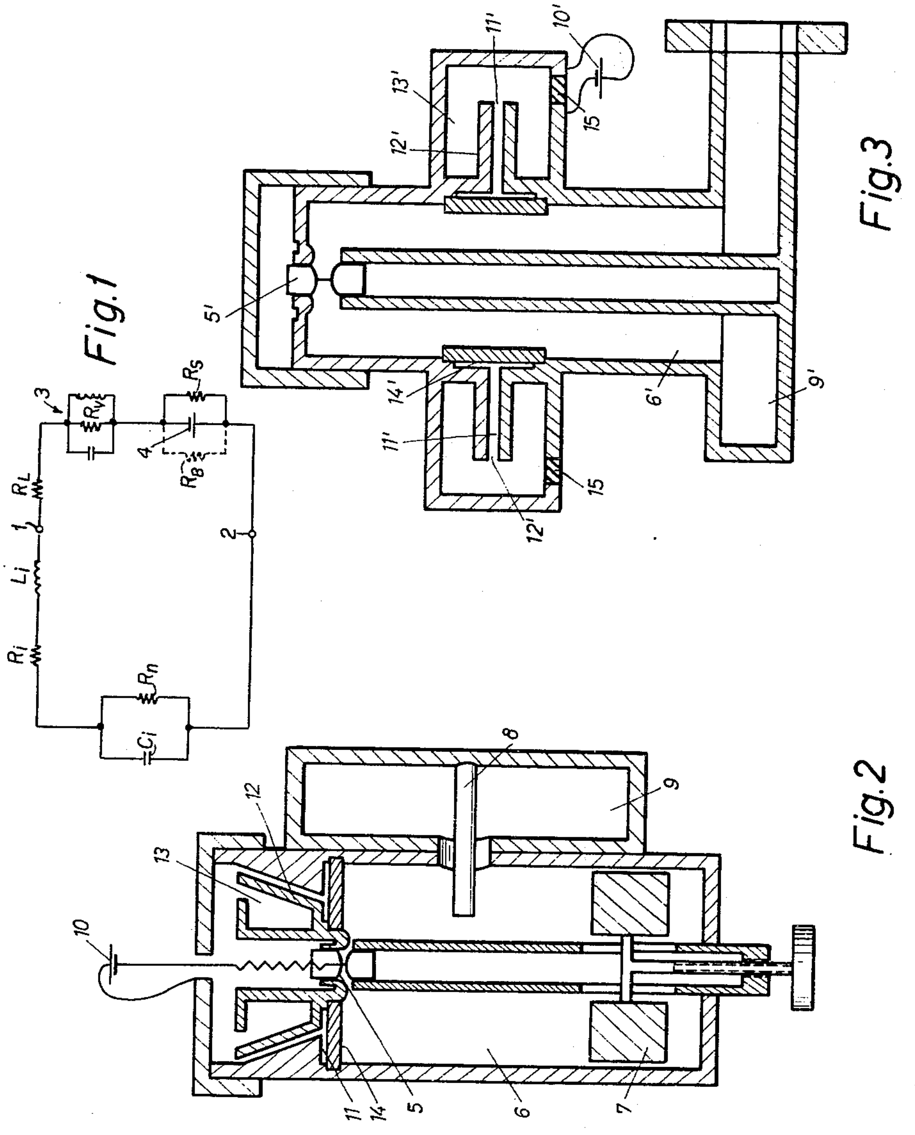
FIG. 1 is an equivalent schematic diagram of an oscillator circuit employing an Esaki diode useful in pointing out the fundamental problems involved in such an arrangement.
FIG. 2 is a cross-sectional view of an embodiment following the principles of the present invention.
FIG. 3 is a cross-sectional view of another embodiment following the principles of the present invention.

Referring to FIG. 1, the fundamental problems of employing an Esaki diode in an oscillator circuit will be explained. On the left-hand side of terminals 1 and 2, an equivalent-circuit diagram of the Esaki diode is illustrated. In parallel relation to its negative resistance $R_n$, whose value may be adjusted by the potential applied thereto, is disposed its internal capacitance $C_i$. In series with this "negative-loss capacitance" are a series resistance $R_i$ and a line inductance $L_i$ resulting from the constructional environment of the Esaki diode. On the *right-hand* side of terminals 1 and 2 is disposed the *external* circuit.

As is well known, the Esaki diode has a current-voltage characteristic of the "dynatron" type. In order to always meet the general stability requirement, $R_0<|-R_n|$, with respect to a negative resistor of the dynatron type acting as an amplifier or generator, the Esaki diode requires an operating resistance in its external circuit which in any case of disturbance, such as frequency deviations, can only become smaller and, hence, behaves like a parallel-resonant circuit, illustrated at 3. $R_n$ is assumed to have the smallest negative value of the diode appearing in its dynatron-type characteristic. $R_0$ results from the series connection of $R_i$, load resistance $R_L$, $R_v$, the resistance value of circuit 3, with the parallel connection of the resistors $R_{st}$ and $R_B$, the internal resistance of battery 4, illustrated by a broken-line representation, biasing the Esaki diode.

For the amplification of very high frequencies with the aid of an element having a negative resistance of the dynatron type, particular attention will have to be given to the following points:

(1) The parallel-resonant circuit in the external circuit must include an inductance of such magnitude that the latter, in connection with the internal capacitance $C_i$ and the internal inductance $L_i$ represents a very strong undercoupled parallel-resonant circuit for the useful frequency in order to make its loss resistance $R_v$ as nearly negligible as possible in the external circuit. Since this can only be realized to a certain extent, it is necessary, with respect to the resonant circuit of an Esaki diode, that the loss be kept as small as possible. This may be accomplished by a low-loss embodiment of a resonant cavity.

(2) When the bias means, battery 4, for the Esaki diode is in the external circuit, the undefined internal resistance $R_B$ of the battery is included in the external circuit, and the stability requirement $R_0<|-R_n|$ cannot be met with respect to all frequencies, and especialy not with respect to very high frequencies. Also in cases where, in accordance with the conventional practice, the source of voltage is bridged by a purely ohmic stabilizing resistor $R_{st}$ having a very low resistance, the stability requirements cannot be met with respect to all frequencies. This is due to the fact that, although the stabilizing resistor has a low resistance value which is a real resistance with respect to all frequencies up to the limiting (cut-off) frequency of the Esaki diode, it also has an inductive component, due to the connecting leads, which increase its magnitude.

The above difficulties are overcome in accordance with the present invention by providing an arrangement for amplifying or generating very-high-frequency oscillations by coupling a coaxial-line resonant cavity to an Esaki diode acting as an active element with a negative resistance in a way that this section, in cooperation with the internal capacitance and the internal inductance of the diode, will act as a strongly undercoupled parallel-resonant circuit. A stabilizing resistor having a sufficiently small magnitude to bypass the source of biasing potential for the diode, apparently in opposition to the requirement for having as small a loss as possible in the resonant circuit, is built into the resonant cavity itself, which is otherwise featured by a low-loss design. The stabilizing resistor is in turn bridged or bypassed only with respect to that frequency range including the useful oscillations by an impedance having a substantially lower value than the stabilizing resistor and a series circuit character, for example, by an open-ended or open-circuit line section having a length equal to one-quarter wavelength at the frequency of the useful oscillations.

Referring to FIG. 2, a cross-sectional view of an embodiment of the present invention is illustrated. To Esaki diode 5, a coaxial line section or resonant cavity 6 is connected in a strongly undercoupled fashion. The length of this section is chosen so that it, in combination with the internal capacitance and the inductance of the diode, constitutes a parallel-resonant circuit. The length of line section 6 and, hence, the oscillating space can be varied by means of movable shorting member 7. With the aid of probe 8 and hollow waveguide 9, the useful oscillation is capacitively coupled into and out of resonating cavity 6. From an externally disposed source of voltage, such as battery 10, Esaki diode 5 is biased to exhibit a negative-resistance characteristic. With one electrode of diode 5 connected directly to one terminal of battery 10, and the other electrode of diode 5 coupled to the other terminal of battery 10 through the conductive wall of cavity 6, it is required that a metallic interruption 11 be provided in the wall of cavity 6. Thus, interruption 11 bridges or bypasses battery 10. Interruption 11 and, hence, battery 10 is short circuited with respect to the frequency of the useful oscillation by an open-ended or open-circuit line section 12 having a length of one-quarter wavelength at the frequency of the useful oscillation. This effect is further amplified by the quarter-wavelength choke 13. In order to avoid unpredictable, unstable conditions, or self-excitation at other frequencies, the above-mentioned stability requirement $R_0<|-R_n|$ has to be met with respect to all frequencies ranging from 0 to the limiting frequency of the diode. For this reason, battery 10 is bypassed by a stabilizing resistor 14, having a sufficiently low resistive value. Resistor 14 in order to avoid any possible line inductance which in combination with the internal resistance of the source of voltage (battery 10) might be the cause of unwanted oscillations at certain frequencies, is disposed in or built cavity 6 in a parallel relation with metallic separation 11, thus bypassing battery 10. In the present embodiment, stabilizing resistor 14 is in the form of a toroidal disk.

Metallic separation 11 may also be disposed near the end of coaxial-line resonant cavity 6 remote from diode 5. In this arrangement, toroidal disk-shaped resistor 14 will also be disposed in the end of cavity 6 remote from diode 5.

In the embodiment of FIG. 2, with resistor 14 disposed as illustrated, or at the other end of cavity 6, resistor 14 is disposed in the current loop of resonant cavity 6, and naturally the entire oscillating current must be bypassed by the choke arrangement 12 and 13.

The stabilizing resistor (resistor 14, FIG. 2), in another embodiment illustrated in FIG. 3, is disposed in the current node of the resonant cavity where this resistor is essentially bypassed by the oscillating current. In the embodiment of FIG. 3, the circuit elements having the same functions as in FIG. 2 are indicated by the same reference numerals primed.

The difference between the arrangement of FIG. 3 and the arrangement according to FIG. 2 resides in the fact that metallic separation 11' in line resonant cavity 6' is so positioned that stabilizing resistor 14' is disposed in the current node of cavity 6'. This calls for the hollow cylindrical shape of stabilizing resistor 14' illustrated in FIG. 3. In addition, this arrangement requires an additional metallic separation 15 in the wall of choke 13', which is filled with a lossy insulator. The biasing potential from the source of voltage, battery 10', is coupled to the wall of choke 13' in a manner to be in shunt relation with separation 15. The useful output is coupled into or out of resonant cavity 6' inductively via hollow waveguide 9'.

While I have described the principles of my invention in connection with specific apparatus, it is to be clearly understood that this description is made only by way of example and not as a limitation to the scope of my invention as set forth in the objects thereof and in the accompanying claims.

I claim:

1. An oscillator for generating very high-frequency oscillations comprising:
a diode;
means coupled across said diode to bias said diode to establish a negative-resistance characteristic thereof;
a resonant circuit coupled across said diode to provide in combination with the internal capacitance and inductance of said diode a strongly undercoupled parallel-resonant circuit;
a stabilizing resistor coupled in shunt relationship to said bias means; and
an impedance having a lower value than the resistance value of said stabilizing resistor coupled in shunt relationship to said stabilizing resistor to bypass said stabilizing resistor only in the frequency range including the useful oscillations.

2. An oscillator for generating very high-frequency oscillations comprising:
an Esaki diode;
a coaxial-line resonant cavity coupled across said diode to provide in combination with the internal capacitance and inductance of said diode a strongly undercoupled parallel-resonant circuit;
means coupled between the central and outer portions of said coaxial-line resonant cavity to bias said diode to establish a negative-resistance characteristic therefor;
a stabilizing resistor having a low resistance value built into said cavity therein to bypass said bias means; and
means having an impedance value less than the resistance value of said stabilizing resistor with a series-circuit characteristic disposed to bypass said stabilizing resistor only in the frequency range including the useful oscillations.

3. An oscillator for generating very high-frequency oscillations comprising:

an Esaki diode;

a coaxial-line resonant cavity coupled across said diode to provide in combination with the internal capacitance and inductance of said diode a strongly undercoupled parallel-resonant circuit;

means coupled between the central and outer portions of said coaxial-line resonant cavity to bias said diode to establish a negative-resistance characteristic therefor;

a stabilizing resistor having a low resistance value built into said cavity to bypass said bias means; and an open-circuit line section having a length of a quarter-wavelength at the frequency of the useful oscillations coupled to said cavity in a shunt relationship to said stabilizing resistor to bypass said stabilizing resistor only in the frequency range including said useful oscillations.

4. An oscillator according to claim 3, wherein said stabilizing resistor is in the form of a toroidal disk.

5. An oscillator according to claim 3, wherein said stabilizing resistor is in the form of a hollow cylinder.

6. An oscillator according to claim 3, wherein said stabilizing resistor is disposed in a current loop of said cavity.

7. An oscillator according to claim 6, wherein said stabilizing resistor is in the form of a toroidal disk.

8. An oscillator according to claim 3, wherein said stabilizing resistor is disposed adjacent said diode.

9. An oscillator according to claim 8, wherein said stabilizing resistor is in the form of a toroidal disk.

10. An oscillator according to claim 3, wherein said stabilizing resistor is disposed at a current node of said cavity.

11. An oscillator according to claim 10, wherein said stabilizing resistor is in the form of a hollow cylinder.

References Cited by the Examiner

UNITED STATES PATENTS

| | | | |
|---|---|---|---|
| 2,975,304 | 3/61 | Price et al. | 331—107 |
| 2,984,795 | 5/61 | Robillard | 331—107 |
| 3,081,436 | 3/63 | Watters | 307—88.5 |

OTHER REFERENCES

Electronics, Nov. 18, 1960, pages 92–95.

Article by Hines in Bell System Tech. Journal, May 1960, pages 477–513.

ROY LAKE, *Primary Examiner.*

JOHN KOMINSKI, *Examiner.*